United States Patent [19] | [11] 4,387,067
Kobayashi et al. | [45] Jun. 7, 1983

[54] CERAMIC ARC TUBE OF METAL VAPOR DISCHARGE LAMPS AND A METHOD OF PRODUCING THE SAME

[75] Inventors: Kazuo Kobayashi, Nagoya; Mamoru Furuta, Toyoake; Yoshio Maeno, Nagoya, all of Japan

[73] Assignee: NGK Insulators, Ltd., Japan

[21] Appl. No.: 229,503

[22] Filed: Jan. 29, 1981

[30] Foreign Application Priority Data

| | | | |
|---|---|---|---|
| Feb. 6, 1980 | [JP] | Japan | 55-12377 |
| Feb. 28, 1980 | [JP] | Japan | 55-24207[U] |
| Feb. 28, 1980 | [JP] | Japan | 55-24208[U] |
| Mar. 4, 1980 | [JP] | Japan | 55-27790[U] |
| Mar. 11, 1980 | [JP] | Japan | 55-31354[U] |
| Mar. 27, 1980 | [JP] | Japan | 55-41230[U] |

[51] Int. Cl.[3] .......... C04B 35/64
[52] U.S. Cl. .......... 264/63; 264/1.2; 264/66; 264/523
[58] Field of Search .......... 264/1.2, 63, 66, 523; 313/220

[56] References Cited

U.S. PATENT DOCUMENTS

| | | | |
|---|---|---|---|
| 3,026,210 | 3/1962 | Coble | 264/56 |
| 3,875,277 | 4/1975 | Bratton et al. | 264/1.2 |
| 3,907,949 | 9/1975 | Carlson | 264/66 |
| 4,161,672 | 7/1979 | Cap et al. | 313/220 |
| 4,211,758 | 7/1980 | Buhrer | 264/66 |
| 4,254,356 | 3/1981 | Karikas | 313/220 |
| 4,277,716 | 7/1981 | Bauks, Jr. | 313/220 |
| 4,339,686 | 7/1982 | Potter | 313/220 |

*Primary Examiner*—Donald E. Czaja
*Assistant Examiner*—W. Thompson
*Attorney, Agent, or Firm*—Parkhurst & Oliff

[57] ABSTRACT

The disclosed ceramic arc tube of metal vapor discharge lamps has an arc discharge portion with electrode-holding end portions integrally formed at opposite ends thereof. The outside diameter of the arc discharge portion is larger than that of the electrode-holding end portions. The ceramic arc tube is made by placing a tubular green body in a fusiform cavity of a die, inflating the middle portion of the green body more than end portions thereof, and firing the thus shaped green body.

2 Claims, 16 Drawing Figures

CERAMIC ARC TUBE OF METAL VAPOR DISCHARGE LAMPS AND A METHOD OF PRODUCING THE SAME

BACKGROUND OF THE INVENTION

1. Field of the Invention

This invention relates to a ceramic arc tube of metal vapour discharge lamps such as high-pressure metal vapour discharge lamps and a method of producing the same. More particularly, the invention relates to a ceramic arc tube of discharge lamps which arc tube has an arc discharge portion integrally formed with electrode-holding end portions, the arc discharge portion having a larger outside diameter than that of the end portions, and a method of producing such ceramic arc tube.

2. Description of the Prior Art

High pressure metal vapour discharge lamps using recently-developed translucent polycrystalline alumina ceramic arc tubes, which arc tubes withstand vapours of such metals as sodium or metal halides, have a high luminous efficiency, so that such discharge lamps have attracted much attention from the standpoint of energy saving. In the description of the invention, the metal vapour discharge lamp refers to the high pressure sodium vapour discharge lamp, the metal halide vapour discharge lamp, or the like.

The metal vapour discharge lamp comprises an arc tube holding metal vapour and a protective envelope surrounding the arc tube. Accordingly, the arc tube is required to have both a good translucency of light and a high corrosion resistivity against the light-emitting material sealed therein such as sodium vapour or the metal halide vapour. Only translucent alumina ceramics has been found to meet the need of high corrosion resistivity against the light-emitting material and the good translucency, so that the alumina ceramics has been used almost exclusively for the arc tube of the high-pressure metal vapour discharge lamps.

The transluscent alumina ceramics, however, has a lower thermal malleability than the quartz. Thus, although the quartz arc tube for mercury-vapour lamps can be melted and sealed simply by heating it to a high temperature, the sealing of the alumina ceramics arc tube with the light-emitting material disposed therein requires a comparatively complicated process.

In a typical conventional process of sealing a translucent alumina ceramic arc tube, the opening ends of the fired alumina arc tube is sealed by means of glass frit material with the mounting caps made of either a heat-resistant metal or alumina ceramic which have a coefficient of thermal expansion similar to that of the alumina arc tube.

Furthermore, heat-resistant metallic electrodes provided with the through-holes for introducing the light emitting materials are sealed at the center portion of the above caps by glass frit.

The conventional sealing process has shortcomings in that the process is difficult to carry out because of the requirements of heating at the high temperature of 1,300° to 1,400° C. and in vacuo.

Moreover, in the glass frit sealed arc tube, the light emitting materials enclosed in the ceramic tube is susceptible to leakage due to the comparatively widely sealing area of glass frit, exposure to the high operating temperature and thermal shock caused by on-off operations of the lamp.

Especially, when being used in the improved discharge lamp provided with a high luminous efficiency and high colour rendering, the alumina tube sometimes fail to meet the required reliability including the errosion resistivity at a high temperature under high pressure. Furthermore, the use of the caps made of metal or ceramics results in an increased number of parts and requirement of severe dimensional accuracy, whereby the manufacturing cost becomes high and the products tend to be uneconomical.

To obviate the aforesaid shortcomings, the so-called semi-closed type alumina arc tubes have been proposed, in which ceramic caps are applied to opposite ends of each alumina tube before firing in such a manner that the caps are integrally secured to the alumina tube when they are fired together. More specifically, such semi-closed type alumina arc tube is generally produced by a method comprising steps of preparing a tubular green body having opposite ends thereof open by using an alumina series material whose firing shrinkage is fully known, preparing cap green bodies by using an alumina series material whose firing shrinkage is smaller than that of said tubular green body, fitting the cap green bodies in end openings of the tubular green body, and firing the tubular green body having the cap green bodies in vacuo or in hydrogen atmosphere. Whereby, a translucent alumina arc tube with caps integrally secured thereto is produced by the firing. This method of making the semi-closed type alumina arc tube has shortcomings in that the step of applying the cap green bodies to the tubular green body tends to cause deformation and damage of the green bodies, that the control of the firing shrinkages of the tubular green body and the cap green bodies is difficult, and that cracks are sometimes occured at end portions of the alumina arc tube to cause incomplete joint of the caps with the alumina arc tube which lead to possible leakage of the sealed light-emitting material.

In another method of the prior art to produce an arc tube having an alumina tube with caps integrally formed therewith by using the same material for the tube and the caps, a molding core made of a metal or organic substance having a low melting point is placed in the cavity of a die, and an integral body of the alumina tube with caps is formed in the space between the inner surface of the die and the molding core by applying pressure from the outside of the die. The molding core is then melted away by heating, out of the alumina arc tube. This method of using the molding core has technical difficulties in that pressing of the tubular alumina green body to the molding core tends to contaminate the tubular alumina green body with the material of the molding core, that the molten material of the molding core sometimes permeates into the alumina arc tube, and that traces of the molding core material left on the alumina arc tube become defects. Accordingly, this method of using the molding core has not commercially been used in industries due to the aforesaid technical difficulties.

The shape of the alumina arc tube for metal vapour discharge lamps has been limited to straight tube, because the malleability of the alumina arc tube is not so high as the quartz arc valve used in mercury-vapour lamps. The quartz valve can be easily shaped simply by heating it to a high temperature. Although the salient feature of the metal vapour discharge lamp depends on the high luminous efficiency, it is hard to further improve the luminous efficiency if the shape of the arc tube is limited to straight one. More specifically, the transmittance of the translucent alumina ceramics has been improved to 94 to 96% already, so that there is not much room left to improve the luminous efficiency by raising the transmittance of the alumina arc tube.

Theoretically, the luminous efficiency may be improved by raising the vapour pressure, i.e., by raising the wall loading of the arc tube, as confirmed by experiments. In practice, however, when the wall loading exceeds the currently used level such as 20 W/cm$^2$ in the case of the high-pressure sodium vapour discharge lamp, the temperature at the center portion of the arc tube becomes very high, e.g., 1,200° to 1,300° C., so that the metal vapour in the arc tube such as sodium vapour reacts with the alumina tube resulting in the blackening phenomenon which shortens the service life of the discharge lamp. Accordingly, the improvement of the luminous efficiency by raising the wall loading of the arc tube is not practicable.

SUMMARY OF THE INVENTION

Therefore, an object of the present invention is to obviate the aforesaid shortcomings and technical difficulties of the prior art, by providing an improved method of producing the arc tube. In a method of the present invention, a tubular green body is made by using mixture material of alumina fine particles and plasticizer whose main ingredient is non-thermoplastic organic substance, and the tubular green body is placed in the fusiform cavity of a die and fluid pressure is applied to the inside of the tubular green body, so as to shape the tubular green body by inflating the middle portion thereof more than end portions thereof. The thus shaped green body is removed from the die and fired. The shaped green body may be pre-fired to remove the plasticizer therefrom.

Another object of the present invention is to provide a ceramic arc tube of metal vapour lamps, which ceramic tube has an arc discharge portion with electrode-holding end portions integrally formed at opposite longitudinal ends thereof, the arc discharge portion having a larger outside diameter than that of the end portions.

In a preferred embodiment of the present invention, the wall thickness $t_1$ of the ceramic arc tube at the arc discharge portion is thinner than the wall thickness $t_2$ at the electrode-holding end portions thereof, preferably in a range of $1.5t_1 < t_2 < 5t_1$.

A further object of the present invention is to provide a ceramic arc tube of any of the aforesaid types, in which the two electrode-receiving end portions have different inside diameters for electrodes.

A still further object of the invention is to provide a ceramic arc tube of any of the aforesaid types, in which the cross section of the arc discharge portion along the longitudinal center line of the ceramic arc is of ellipse with a major axis b along the longitudinal central axis and a minor axis a perpendicular thereto, the ratio a:b being in a range of 1:4 to 1:8.

In another preferred embodiment of the ceramic arc tube of the invention, the cross section of the electrode-holding end portions perpendicular to the longitudinal central axis of the ceramic arc tube is circular, while the cross section of the arc discharge portion perpendicular to said longitudinal central axis at the midpoint of the two end portions is of ellipse with a minor axis to major axis ratio of 1:1.5 to 1:4.

Another object of the invention is to provide a ceramic arc tube of any of the aforesaid types, in which the inside surface of the arc discharge portion is curved with different radii of curvature $r_1$ and $r_2$ at opposite ends thereof, the ratio $r_1$:$r_2$ being in a range of 1:1.5 to 1:2.

BRIEF DESCRIPTION OF THE DRAWINGS

For a better understanding of the invention, reference is made to the accompanying drawings, in which.

Figure 1:
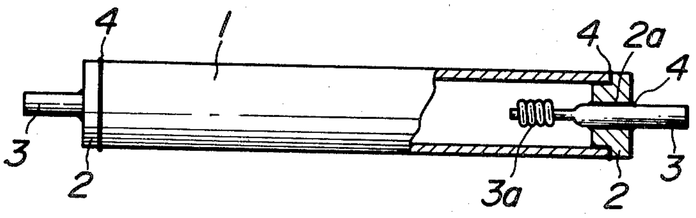
FIG.1 PRIOR ART
FIG. 1 is a front view of an arc tube of the prior art, with a part thereof cutaway.

Throughout different views of the drawing, 1 is an alumina tube, 2 is a cap, 3 is a heat-resistant metal electrode, 4 is glass frit, 5 is a tubular green body, 6 is a die, 7 is a cavity, 8 is a pressure-supply terminal, 9 is an end member, 10 is a shaped body, 11 is a coupling portion, 12, 21, 31, 41, 51, and 61 are ceramic arc tubes, 13, 14, 23, 33*a* 33*b*, 43, 53, 63*a*, and 63*b* are end portions, 15, 22, 32, 42, 52, and 62 are arc discharge portions, and 53 is a ceramic cap.

DESCRIPTION OF THE PREFERRED EMBODIMENTS

Before entering the details of the invention, a ceramic arc tube of the prior art will be briefly reviewed by referring to FIG. 1. An alumina arc tube 1 is fired with opposite ends left open, and the open ends are closed by applying caps 2 thereto while inserting glass frit 4 therebetween to seal out the end openings. The cap 2 is made of niobium or alumina ceramics, so that the cap has a similar coefficient of thermal expansion as that of the alumina tube. Heat-resistant metallic electrodes 3, one of which introduces a light-emitting material 3*a*, are inserted into the alumina tube 1 through holes of the caps 2, and the holes of the caps 2 are sealed by glass frit 4. The sealing by the glass frit 4 is effected by heating at a high temperature in vacuo.

As pointed out above, the alumina arc tube of the prior art has shortcomings of possible leakage of the light-emitting materials at the joint of the alumina arc tube 1 and the caps 2, the need of high dimensional accuracy of the caps 2 and those portions of the alumina arc tube 1 which engage the caps 2, and the high manufacturing cost.

The present invention obviates the shortcomings of the prior art by providing an improved ceramic arc tube comprising an arc discharge portion having end portions integrally formed therewith. The integral formation of the end portions with the arc discharge portion eliminates the caps and the requirement of dimensional accuracy of the caps and the cap-engaging surfaces of the arc discharge portions. Besides, the number of sealings is minimized by the aforesaid integral formation of the invention.

In a method of the invention to produce a ceramic arc tube, a tubular green body is formed by using a mixture material containing fine alumina particles and plasticizer, and the tubular green body is inflated in the fusiform cavity of a die and then fired to make the desired ceramic arc tube. To fulfil the object of the invention, the mixture material to form the tubular green body must produce alumina ceramics with a desired transmittance. Accordingly, the mixture material must contain fine particles of alumina with a high purity and a high activity, and platicizer whose major ingredient is non-thermoplastic organic substance. The organic substance of the plasticizer may be decomposed or may sublimate by pre-firing. The mixture material may further contain a suitable sintering auxiliary agent and a mixing auxiliary agent such as water. The ingredients of the mixture material must be weighed so as to provide a proper mixture ratio, and thoroughly mixed by a wet procedure, and kneaded or dried so as to provide molding body with a suitable plasticity.

The fine particles of alumina and the sintering auxiliary agent can be of those of the prior art, and for instance can be selected from the group of α-alumina, γ-alumina, magnesium compounds, and rare earth element compounds, while considering such factors as the required transmittance, the expected firing conditions, and the required mechanical properties.

The preferred non-thermoplastic organic substance to be used in the present invention are polyvinyl alcohol or methyl cellulose. The kind and the amount of the non-thermoplastic substance should be so selected as to provide suitable plasticity of the molding body while considering the configuration and the size of the final product. Thus, there is no specific restrictions on the non-thermoplastic organic substance.

Although thermoplastic organic substance such as polypropylene or polyethylene may be used as a part of the plasticizer to prevent deformation of the product due to re-softening during the preheating for removing the organic substance, the major ingredients of the plasticizer must be non-thermoplastic organic substances.

The mixing auxiliary agent is required to wet well the ingredients being mixed, to act as a solvent, and to be removed during the after-process of drying and firing. Water is generally used as the mixing auxiliary agent, but non-aqueous solvent may be also used as the mixing auxiliary agent depending on the configuration of the final product.

A de-airing pug-mill may be advantageously used to mix the aforesaid mixture material so as to provide the molding body with a proper plasticity, because the elimination of air from the molding body by such de-airing pug mill is effective in achieving the desired plasticity.

A tubular green body 5 (FIG. 2) is formed by shaping the molding body thus prepared with a molding machine or a wet process. Preferably, the inside diameter of the tubular green body should be such that, when fired, the corresponding inside diameter is the same or slightly larger than the diameter of the electrode of the discharge lamp on which the ceramic arc tube is mounted.

Figure 2:
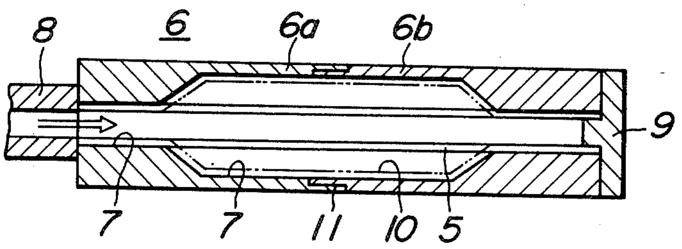
FIG. 2 is a schematic sectional view, showing a process according to the present invention.

Referring to FIG. 2, the tubular green body 5 is placed in a die 6 having a cavity 7 of fusiform shape. The cavity 7 is defined by the fusiform inside surface of the die 6. A pressure-applying terminal 8 of a pressure source (not shown) is connected to one end of the die 6, so as to apply fluid pressure to the inside of the tubular green body 5 through that end. An end member 9 is applied to the opposite end of the die 6, so as to close the opposite end opening of the tubular green body 5. When the fluid pressure is applied to the inside of the tubular green body 5 from the pressure source (not shown), the middle portion of the green body 5 between opposite end portions thereof is inflated more than the end portions, whereby a shaped body 10 is produced as shown by dash-dot-dot lines of FIG. 2. After stopping the application of the pressure from the pressure source (not shown), the pressure-applying terminal 8 and the end member 9 are removed from the die 6, and the shaped body 10 is removed from the die 6.

To facilitate the removal of the shaped body 10, the die 6 is made of two halves *6a* and *6b*, by dividing the die 6 substantially along a plane perpendicular to the longitudinal axis thereof at the center thereof while forming coupling portions 11 at the abutting portions of the halves *6a* and *6b*, as shown in FIG. 2. The halves *6a* and *6b* are so shaped as to minimize burrs on the outer surface of the shaped body 10 while ensuring the easy removal of the shaped body 10.

Figure 3:
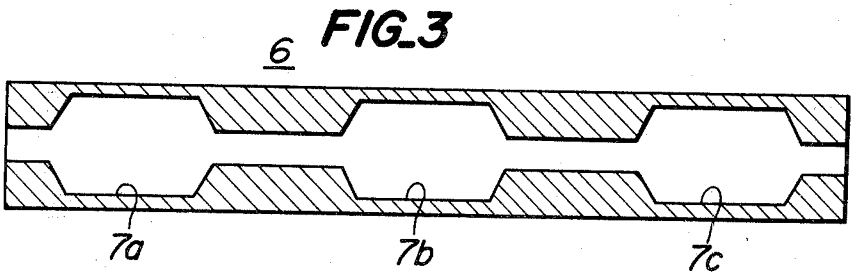
FIG. 3 is a schematic sectional view of a modified die which can be used in the process of the invention.

Although the die 6 of FIG. 2 has only one cavity 7, it is possible to form two or more cavities 7 in one die 6. For instance, FIG. 3 shows a die 6 which has three cavities *7a*, *7b*, and *7c* disposed in a row. With the die 6 of FIG. 3, three shaped bodies 10 will be formed as connected each other, and such three shaped bodies 10 may be separated at the adjacent end portions either immediately after the removal from the die 6 or after firing as will be described later. What is required to the fusiform shape of the cavity 7 of the die 6 is to ensure the production of the desired shape of the final ceramic arc tube suitable for the desired properties of the discharge lamp and to facilitate the removal of the shaped body. Thus, the fusiform shape of the cavity 7 includes a variety of modifications.

As regards the fluid pressure to inflate the tubular green body, pneumatic pressure is preferable, but oil pressure may be used too. The fluid as a carrier of the pressure should not corrode the tubular green body 5. If there is a possibility of such corrosion, a thin resilient film such as a rubber film may be disposed on the inner surface of the green body 5 which is exposed to the fluid pressure.

The shaped body 10 thus formed may be pre-heated, for instance, to remove the plasticizer therefrom which plasticizer is added in the molding body to facilitate the shaping of the tubular green body 5. However, the pre-heating is not essential in the present invention. The pre-heating conditions may be determined depending on the type of the plasticizer used and the size of the final product. The preferable temperature for the pre-heating is 1,200° C. or lower, which temperature will not deteriorate the activity of the particles in the shaped body 10.

Figure 4:
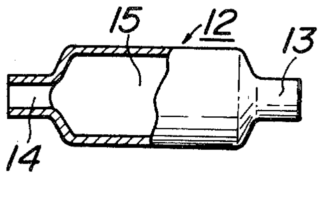
FIGS. 4 and 5 are partially cutaway front views of ceramic arc tubes according to the present invention.
Figure 5:
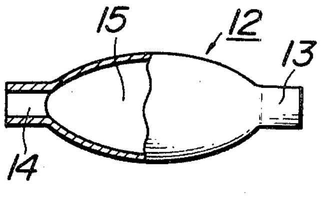

Then, final firing is carried out on the shaped body 10 at a high temperature either immediately after removal from the die 6 or after the aforesaid pre-heating, so as to produce the desired ceramic arc tube 12 as shown in FIG. 4 or FIG. 5. The temperature, the duration, and the atmosphere of the final firing are determined depending on the chemical composition of the starting mixture material, the size of the final product, the required transmittance, and the required mechanical properties.

Referring to FIGS. 4 and 5, the ceramic arc tube 12 thus produced has opposite end portions 13 and 14, which have openings of suitable size to hold electrodes of the metal vapour discharge lamp. An arc discharge portion 15 at the middle of the ceramic arc tube 12 is integrally formed with the end portions 13 and 14 without any discontinuous joints therebetween. The arc discharge portion 15 houses light-emitting material therein and it becomes luminous upon energization of the light-emitting material. The aforesaid integral formation of the discharge portion 15 with the end portions 13 and 14 minimizes the number of portions to be sealed. Since the aforesaid process of invention is free from any contamination of the inside surface of the ceramic arc tube 12, excellent transmittance of the ceramic arc tube 12 is ensured.

The embodiment of FIG. 4 has a cylindrical arc discharge portion 15 with a larger outside diameter than that of the end portions 13 and 14. In the embodiment of FIG. 5, the arc discharge portion 15 has a smoothly curved sidewall with a maximum outside diameter which is larger than the outside diameter of the end portions 13 and 14. The shape of the ceramic arc tube 12 of the invention, however, is not restricted to those of FIGS. 4 and 5.

EXAMPLE

A mixture material was prepared by using fine alumina particles with a purity of 99.99% and a grain size of 0.1 to 0.2 micron, which mixture contained additives including 0.05 weight % of magnesium oxide and 0.05 weight % of yttrium oxide, 3 weight % of methyl cellulose as an organic binder, 1 weight % of polyethylene glycol (with a trademark of POLYNON) as a lubricant, 25 weight % of water as a mixing auxiliary agent, and the remainder of the aforesaid fine particles of alumina. The mixture material was thoroughly blended by a kneader and molding body was prepared by milling it by a de-airing pug-mill.

A tubular green body 5 with an outside diameter of 6.5 mm and an inside diameter of 2.5 mm was prepared by extruding the molding body by a piston type extruder, which tubular green body 5 was immediately placed in the fusiform cavity 7 of a die 6 as shown in FIG. 2. One end of the tubular green body 5 was closed by the end member 9, and air was forced into the inside of the tubular green body 5 through the opposite end opening thereof, whereby the tubular green body 5 was transformed into the shaped body 10 whose outer surface was in contact with the inner surface of the die 6 defining the fusiform cavity 7. The outside diameter of the shaped body 10 at the middle portion thereof was about 10 mm and the wall thickness there was about 1.3 mm.

After completion of the shaped body 10 by forcing air under pressure therein, the die 6 carrying the shaped body 10 was dried by heating for about two minutes by an induction type electric drier to harden the outer surface of the substantially tubular shaped body 10, and the dried shaped body 10 was removed from the die 6.

The shaped body 10 was heated for three hours in air at 800° C. to completely remove organic substances therefrom, and then the shaped body 10 was fired in a vacuum furnace for six hours at 1,800° C. Whereby, a ceramic tube 12 was produced.

A gastightness test was carried out on the alumina ceramic arc tube 12 by a helium leak detector, which showed at leak-rate of $10^{-10}$ atm. He CC/sec. The ceramic arc tube 12 withstood a spalling test of heating at 200° C. in the air immediately followed by dipping in water of 20° C. When measured by an integrating sphere type photometer, the ceramic arc tube of this Example shows a total light transmittance of 93%. Thus, excellent properties of the ceramic arc tube 12 for use as an arc tube in a metal vapour discharge lamp were demonstrated.

As proven in the Example, the method of the invention to produce the ceramic arc tube of metal vapour discharge lamps eliminates the application of the caps to the tubular green body as required in the prior art, and the ceramic arc tube of the invention has the arc discharge portion integrally formed with the end portions thereof so as to ensure excellent gastightness. Thus, the method of the invention simplifies the manufacture of the ceramic arc tube, and a wide variety of shapes of the ceramic arc tube can be easily produced by the method of the invention. Especially, the wall thickness of the luminous arc discharge portion can be made thin to provide a high transmittance.

Figure 6:
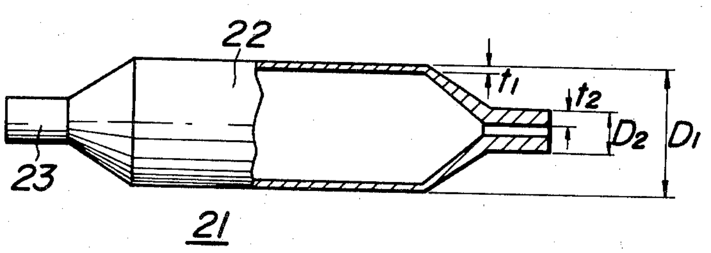
FIG. 6 is a partially cutaway front view of another embodiment of the ceramic arc tube according to the present invention.

Referring to FIG. 6, illustrating another embodiment of the invention, a ceramic arc tube 21 has an arc discharge portion 22 disposed at the middle thereof to hold light-emitting material therein, which material becomes luminous upon energization, and end portions 23 integrally formed with the arc discharge portion 22 at opposite end thereof. The end portions 23 hold discharge electrodes to be mounted thereon.

The arc discharge portion 22 has an outside diameter $D_1$ and a wall thickness $t_1$, while the end portions 23 have outside diameters $D_2$ and a wall thickness $t_2$. In the present invention, the outside diameter $D_1$ of the arc discharge portion 22 must be larger than the outside diameter $D_2$ of the end portions, i.e., $D_1 > D_2$. Preferably, the wall thickness $t_2$ of the end portions 23 is 1.5 to 5 times the wall thickness $t_1$ of the arc discharge portion 22, i.e., $1.5t_1 < t_2 < 5t_1$.

The reasons for choosing the aforesaid dimensional relationship in the present invention are as follows. The arc discharge portion 22 becomes the hottest part of the high-pressure metal vapour discharge lamp when the lamp is energized. If the temperature of the arc discharge portion 22 becomes too high, the light-emitting material namely, metal vapour sealed therein tends to chemically react with the ceramics constituting the arc discharge portion 22, so as to deteriorate the luminous efficiency and the service life of the metal vapour discharge lamp. Accordingly, to suppress the temperature rise of the wall of the arc discharge portion 22, the outside diameter $D_1$ of the arc discharge portion 22 is selected to be larger than the outside diameter $D_2$ of the end portions 23 of the ceramic arc tube 21, which end portions 23 hold electrodes to be mounted thereon and are located close to the coldest spot.

The wall thickness $t_1$ of the arc discharge portion 22 is selected to be comparatively thin, e.g., 0.2 to 1 mm, so as to ensure a high overall transmittance of the discharge lamp. On the other hand, the wall thickness $t_2$ of the end portion 23 is so selected as to provide the required sealing strength of the discharge electrodes and to withstand against thermal stress at the time of on-off operations of the metal vapour discharge lamp. If the wall thickness $t_2$ of the end portions 23 is thinner than 1.5 time the wall thickness $t_1$ of the arc discharge portion 22, the strength becomes insufficient to withstand against the thermal stress at the time of turning on the discharge lamp, so that the high durability or long service life of the ceramic arc tube 21 cannot be ensured. On the other hand, if the wall thickness $t_2$ of the end portions 23 is thicker than 5 times the wall thickness $t_1$ of the arc discharge portion 22, the heat capacity of the portions 23 becomes too large to ensure the desired coldest spot temperature at the end portions 23, and the excessive thickness difference between the arc discharge portion 22 and the end portions 23 tends to cause an undue thermal stress in the ceramic arc tube 21, which may lead to breakage of the ceramic arc tube 21. Thus, the preferable wall thickness $t_2$ of the end portions 23 is selected to be in a range of 1.5 time to 5 times the wall thickness $t_1$ of the arc discharge portion 22.

Figure 7:
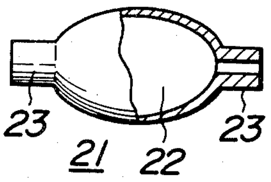
FIGS. 7 through 9 are partially cutaway front views of different embodiments of the ceramic arc tube of the invention having arc discharge portions with smoothly curved sidewalls.

The arc discharge portion 22 in the embodiment of FIG. 6 is substantially of straight cylinder, and the opposite ends of the arc discharge portion 22 are tapered toward the end portions 23 for connection therewith. It is also possible to reduce the outside diameter of the arc discharge portion 22 from its maximum value $D_1$ gradually to the outside diameter $D_2$ of the end portions 23 as shown in FIG. 7.

Figure 8:
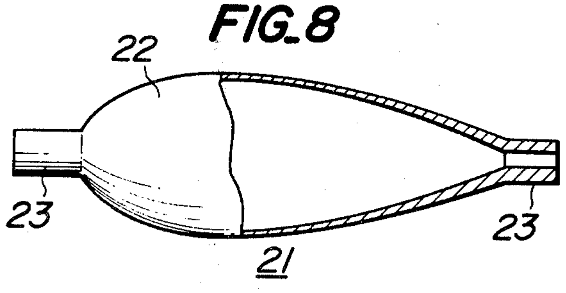
Figure 9:
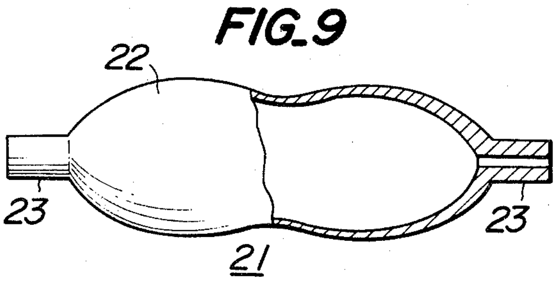

The dimensions of the arc discharge portion 22 of the ceramic arc tube 21, such as the length, the outside diameter, and the shape thereof, can be determined depending on given specifications of the metal vapour discharge lamp on which the ceramic arc tube 21 is mounted. For instance, the cross section of the arc discharge portion 22 taken along the longitudinal axis of the ceramic arc tube 21 can be of ellipse as shown in FIG. 7, or of egg shape with the maximum outside diameter located toward one of the two end portions 23 as shown in FIG. 8, or of cocoon shape with two maximum outside diameter portions on opposite sides of the longitudinal center thereof as shown in FIG. 9.

The dimensions of the end portions 23, such as the length, the outside diameter, and the inside diameter of the electrode-holding hole thereof, can be determined so as to provide heat radiation characteristics suitable for given specifications of the metal vapour discharge lamp on which the ceramic arc tube 21 is to be mounted; namely, the material and dimensions of the electrodes to be secured to the end portions 23, the required strength of sealing, and the temperature and the location of the coldest spot.

In the embodiments of FIGS. 6 through 9, the outside diameter of the arc discharge portion at the middle of the ceramic arc tube is larger than the outside diameter of the end portions thereof, so that the luminous efficiency and the colour rendition of the metal vapour discharge lamp, especially those of the high-pressure discharge lamp, can bimproved while ensuring a long service life of the ceramic arc tube. The aforesaid relationship of the wall thicknesses between the arc discharge portion and the end portions also ensure a high sealing strength of the discharge electrode and a high strength against thermal stress, while maintaining the required transmittance.

Figure 10:
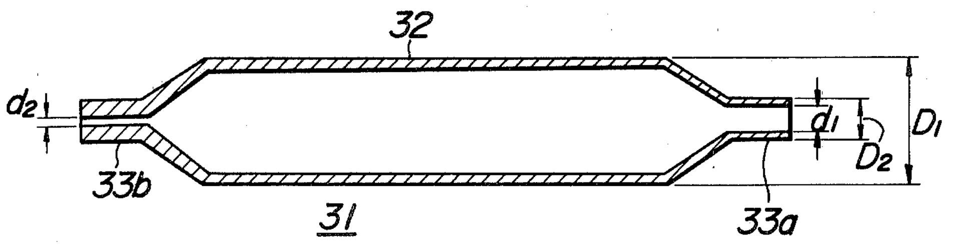
FIGS. 10 and 11 are schematic sectional views of ceramic arc tubes of the invention having differently sized electrode-holding end portions at opposite ends of the arc discharge portions thereof.

Referring to FIG. 10 a translucent ceramic arc tube 31, representing another embodiment of the present invention, has an arc discharge portion 32 integrally formed with electrode-holding end portions **33*a* and 33*b* of the ceramic arc tube 31 are integrally formed with the arc discharge portion 32. The outside diameter $D_1$ of the arc discharge portion 32 is larger than the outside diameter $D_2$ of either one of the end portions 33*a* and 33*b*. One end portion 33*a* has a hole with an inside diameter $d_1$ to hold and seal a discharge electrode, which inside diameter $d_1$ is larger than an inside diameter $d_2$ of another hole at the other end portion 33*b*** for holding and sealing a discharge electrode.

When the metal vapour lamp on which the ceramic arc tube 31 is mounted is energized, if the temperature of the arc discharge portion 32 becomes too high, the ceramics constituting the arc tube 31 tends to chemically react with the light-emitting material sealed therein, so that the luminous efficiency of the discharge lamp may be deteriorated and the service life of the discharge lamp may be shortened. To suppress the temperature rise, the outside diameter $D_1$ of the arc discharge portion 32 at the middle of the ceramic arc tube 31 is selected to be larger than the outside diameter $D_2$ of the electrode-holding end portions **33*a* and 33*b* located close to the coldest spot. The inside diameter $d_1$ of the hole at one end portion 33*a* is so selected as to hold and seal a metallic niobium tube providing a passage to insert a tungsten electrode introducing the light-emitting material mounted at the tip thereof and to enclose the light-emitting material therein. The inside diameter $d_2$ of the hole at the other end portion 33*b*** is selected so as to hold and seal a tungsten rod electrode having a smaller outside diameter than that of the aforesaid niobium tube.

The integral formation of the arc discharge portion 32 at the middle of the arc tube 31 and the end portions **33*a* and 33*b* can be achieved for instance by making the arc discharge portion 32 straight tubular and tapering the opposite ends of the arc discharge portion 32 toward the end portions 33*a* and 33*b*, as shown in FIG. 10. It is also possible to gradually reduce the outside diameter of the arc discharge portion 32 as it extends from the central part thereof toward the opposite end portions 33*a* and 33*b*, as shown in FIG. 11**.

Figure 11:
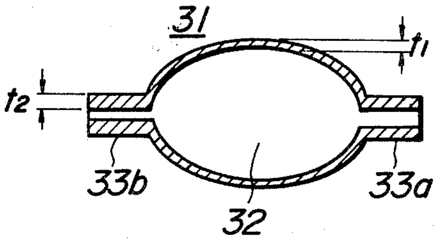

The configuration of the arc discharge portion 32 of the ceramic arc tube 31 is not restricted to those shown in FIGS. 10 and 11. The length, the outside diameter, and the shape of the arc discharge portion 32 of the ceramic arc tube 31 can be selected so as to meet given specifications of the metal vapour discharge lamp on which the ceramic arc tube 31 is to be mounted.

Referring to FIG. 11, the wall thickness $t_1$ of the central part of the arc discharge portion 32 is rather thin to provide a high transmittance of the discharge lamp. On the other hand, the wall thickness $t_2$ of the end portions **33*a* and 33*b* is rather thick to ensure proper sealing strength of the discharge electrodes and to provide a high mechanical strength against thermal stress due to on-off operations of the discharge lamp. In general, it is preferable to keep the relationship of $t_1 < t_2$, namely, to keep the wall thickness of the central part of the arc discharge portion 32 thinner than the wall thickness of the end portions 33*a* and 33*b***.

In the embodiments of FIGS. 10 and 11, the structure of keeping the outside diameter of the luminous arc discharge portion larger than that of the end portions improves the luminous efficiency and colour rendition of a high-pressure metal vapour discharge lamp and ensures a long service life of the ceramic arc tube. Besides, one of the two electrode-holding end portions has a hole adapted to seal only a bar-like tungsten electrode, while the other end portion has a hole adapted to seal only a metallic niobium tube, so that the amount of the expensive and less corrosion-resistant niobium is minimized and the small sealing area to hold the bar-like tungsten electrode results in an improved reliability of the sealing.

The integral formation of the luminous arc discharge portion and the electrode-holding end portions eliminates the need of sealing caps which have been used in the prior art, provides a high corrosion resistance against the light-emitting material sealed therein, so as to improve the luminous efficiency and the colour rendition, and gives strong sealing strength of the electrodes and a high strength against the thermal stress while maintaining the necessary transmittance.

Figure 12:
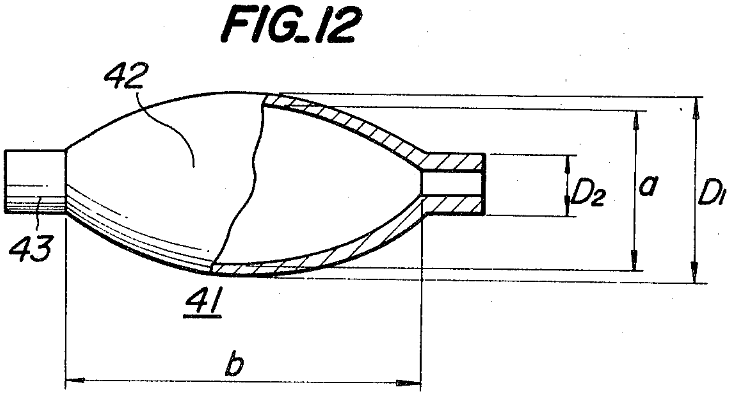
FIGS. 12 and 13 are partially cutaway front views of different embodiments of the ceramic arc tube of the invention, having arc discharge portions with elliptic cross sections.

In another embodiment of the invention as shown in FIG. 12, a translucent ceramic arc tube 41 has a luminous arc discharge portion 42 formed at the middle of the arc tube 41 and electrode-holding end portions 43 integrally formed at the opposite ends of the arc discharge portion 42. The outside diameter $D_1$ of the arc discharge portion 42 at the central part thereof is larger than the outside diameter $D_2$ of the end portions 43. The cross section of inside space of the arc discharge portion 42 taken along a longitudinal central axis of the ceramic arc tube 41 is of ellipse having a major axis b along said central axis and a minor axis a perpendicular thereto with an a:b ratio of 1:4 to 1:8.

When a metal vapour discharge lamp having the ceramic arc tube 41 is energized, if the temperature of the central part of the arc discharge portion 42 is raised too high, the ceramics consituting the arc discharge portion 42 tends to chemically react with the sealed metal vapour, so as to reduce the luminous efficiency and the service life of the discharge lamp. To suppress the temperature rise, the outside diameter $D_1$ of the central part of the arc discharge portion 42 is larger than the outside diameter $D_2$ of the end portions 43 close to the coldest spot.

In general, the inside diameter a of the central part of the arc discharge portion 42 and the length b of the inside space of the arc discharge portion 42 along the longitudinal axis of the ceramic arc tube 41 can be determined so as to meet given specifications of the metal vapour discharge lamp, such as the radiant flux (output) and the light-emitting material sealed therein. However, to improve the luminous efficiency and the colour rendition and to ensure a high strength against thermal stress at the time of turning on the discharge lamp and a long service life of the discharge lamp, the aforesaid a:b ratio is preferred. If the length b relative to the inside diameter a is shorter than that to satisfy the ratio a:b of 1:4, the wall temperature at the central part of the arc tube tends to be low and the distance from the center of discharge to the arc tube center tends to be large, whereby the radiant flux is absorbed by the light-emitting material sealed therein before reaching the wall of the arc tube so as to reduce the luminous efficiency, and the temperature of the coldest spot at the end of the arc tube tends to increase, so that stable discharge cannot be expected. On the other hand, if the length b relative to the inside diameter a is longer than that to satisfy the ratio a:b of 1:8, the shortcomings of the arc tube of the prior art cannot be obviated, and the arc tube is weak to thermal stress and the luminous efficiency of and service life of the arc tube are low and short.

The wall thickness of the central part of the luminous arc discharge portion 42 at the middle of the ceramic arc tube 41 having the light-emitting material sealed therein is preferably thinner than the wall thickness of the end portions 43 thereof, so as to provide a high transmittance. The shapes of through holes at the end portion 43 can be determined so as to suit the configurations of discharge electrodes to be inserted and sealed therein. The through holes at the two end portions 43 need not be identical.

In the ceramic arc tube of the embodiment of FIG. 12, the outside diameter of the luminous central portion thereof is larger than that of the end portions thereof and the arc discharge portion thereof has an inner space of ellipsoidal shape, so that the ceramic arc tube improves the luminous efficiency and the colour rendition of the metal vapour discharge lamps and provides a high strength against thermal stress to ensure a high durability and a long service life of the arc tube.

Figure 13:
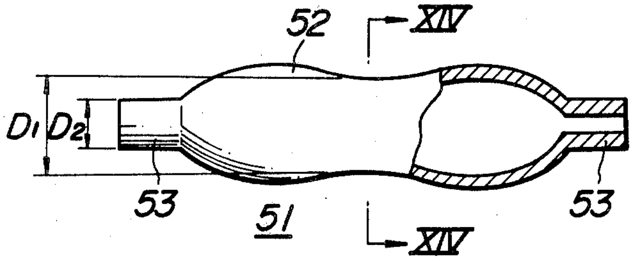
Figure 14:
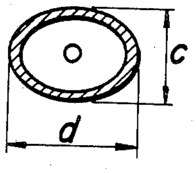
FIG. 14 is a sectional view taken along the line XIV—XIV of FIG. 13.

Referring to FIGS. 13 and 14, a translucent ceramic arc tube 51 representing another embodiment of the present invention has a cocoon-shaped luminous arc discharge portion 52 at the middle of the arc tube 51 to hold the light-emitting material sealed therein and electrode-holding end portions 53 integrally formed at opposite ends of the arc discharge portion 52. The outside diameter $D_1$ of the arc discharge portion 52 at the central part thereof is larger than the outside diameter $D_2$ of the end portions 53. The inside cross section of the central part of the arc discharge portion 52 at right angles to a longitudinal center line of the ceramic arc tube 51 is of ellipse having a minor axis c and a major axis d with a ratio c:d of 1:1.5 to 1:4. The inside cross section of the end portions 53 perpendicular to the aforesaid longitudinal center line is circular.

When a metal vapour discharge lamp having the ceramic arc tube 51 is energized, if the temperature of the central part of the luminous arc discharge portion 52 is raised too high, the ceramics constituting the arc discharge portion 52 tend to chemically react with the sealed metal vapour, so as to reduce the luminous efficiency and the service life of the discharge lamp. To suppress the temperature rise and to prevent the emitted light from being absorbed before leaving the arc tube, the outside diameter $D_1$ of the central part of the arc discharge portion 52 is larger than the outside diameter $D_2$ of the electrode-holding end portions 53 and the inside cross section of the central part of the ceramic arc tube perpendicular to the longitudinal center line thereof is elliptic. As compared with a circular cross section, the aforesaid elliptic cross section reduces the absorption of the emitted light by vapour ions in the arc tube before being radiated through the tube wall toward the outside, so as to improve the luminous efficiency. The elliptic cross section provides different distances between the discharge arc and the tube wall depending on radial directions such as directions of the major axis and the minor axis, so that when the arc tube has a directivety of light emanation as in the case of a reflector lamp, the major axis of the elliptic cross section can be so oriented as to coincide with that direction in which a high temperature rise is likely to occur, and the wall loading of the arc tube can be virtually improved so as to rise the luminous efficiency.

In general, the dimension of the elliptic inside cross section at the central part of the ceramic arc tube can be determined by considering given specifications of the metal vapour discharge lamp, such as radiant flux (output) and the light-emitting material sealed therein. However, to improve the luminous efficiency and the service life of the ceramic arc tube, the aforesaid ratio c:d in the range of 1:1.5 to 1:4 is preferred. If the major axis d relative to the minor axis c is shorter than that to satisfy the ratio c:d of 1:1.5, the wall temperature at the central portion of the arc tube tends to becomes too high and the light absorption by the vapour in the arc tube tends to increase, so that the desired improvement of the luminous efficiency cannot be expected. On the other hand, if it is intended to make the major axis d relative to the minor axis c longer than that to satisfy the ratio of 1:4, the alumina ceramics of such dimensions is difficult to make and the internal stress will remain in the translucent alumina ceramics after the firing and the residual internal stress may result in breakage of the arc tube during use of the discharge lamp.

The circular cross section is preferable at the inside surface of the end portion 53, because in the case of the ceramic arc tube 51 having the arc discharge portion integrally formed with the end portions as shown in FIG. 13, it is economical to use discharge electrodes of round bar type or tubular type, and the circular through holes at the end portions 53 are suitable for holding such discharge electrodes. Furthermore, if ceramic caps 54 holding and sealing the discharge electrodes are used to seal the opposite ends of the ceramic arc tube 51 as shown in FIG. 15, the ceramic caps 54 are easy to make if they are circular and the circular ceramic caps 54 have uniform distribution of thermal stress.

The length of the end portions 53 integrally formed with the arc discharge portion 52 can be determined so as to gastightly seal the discharge electrode fitted therein and the ceramic caps 54 applied thereto.

The wall thickness of the central part of the ceramic arc tube 51 having the light-emitting material sealed therein is preferably thinner than the wall thickness of the end portions 53 thereof, so as to provide a high transmittance. The shapes of the through holes at the end portions 53 can be modified so as to suit the configurations of the electrodes to be held and sealed thereby. The through holes at the two end portions 53 need not be identical.

Figure 15:
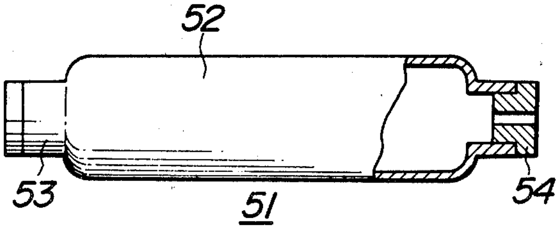
FIG. 15 is a partially cutaway front view of a ceramic arc tube having ceramic caps mounted on end portions thereof.

In the embodiment of FIGS. 13 through 15, the outside diameter of the luminous central portion thereof is larger than that of the end portions thereof and the inside cross section of the central part of the ceramic arc tube is elliptic, so that the ceramic arc tube improves the luminous efficiency of the high-pressure metal vapour discharge lamps and ensures a long service life of the arc tube.

Figure 16:
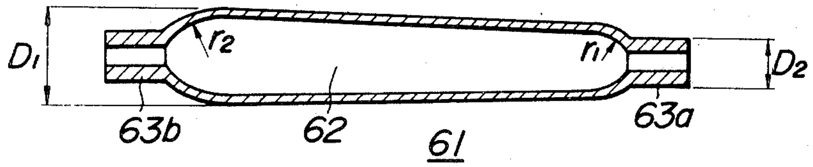
FIG. 16 is a schematic sectional view of a ceramic arc tube having an arc discharge portion whose inside surfaces at opposite ends are curved with different radii of curvature.

Referring to FIG. 16, a translucent ceramic arc tube 61 representing another embodiment of the present invention has a luminous arc discharge portion 62 at the middle thereof to hold light-emitting material to be sealed therein and electrode-holding end portions *63a* and *63b* integrally formed at opposite ends of the arc discharge portion 62. The outside diameter $D_1$ of the arc discharge portion 62 at the central part thereof is larger than the outside diameter $D_2$ of the end portions *63a* and *63b*. The inside surface of one end of the arc discharge portion 62 adjacent the end portion *63a* is curved at a radius of curvature $r_1$, while the inside surface of the opposite end of the arc discharge portion 62 adjacent the opposite end portion *63b* is curved at a radius of curvature $r_2$, and the radii of curvature $r_1$ and $r_2$ preferably have a ratio $r_1:r_2$ of 1:1.5 to 1:2.

In general, the radii of curvature $r_1$ and $r_2$ of the opposite ends of the inside surface of the arc discharge portion 62 can be determined by considering given specifications of the metal vapour discharge lamp, such as radiant flux (output) and light-emitting material to be sealed therein. However, to improve the luminous efficiency and the colour rendition and to ensure a long service life of the discharge lamp by providing a high strength against thermal stress at the time of turning on the discharge lamp, the aforesaid ratio $r_1:r_2$ in the range of 1:1.5 to 1:2 is preferable. If the ratio $r_1:r_2$ is larger than 1:1.5, the temperature control function of the coldest spot is lost, and dispersion is caused in the luminous efficiency and colour rendition and the service life of the discharge lamp tends to be shortened. On the other hand, if the ratio $r_1:r_2$ is less than 1:2, the temperature difference between the opposite electrode-holding end portions becomes too large and the luminous efficiency tends to be reduced.

The wall thickness of the central part of the ceramic arc tube 61 having the light-emitting material sealed therein is preferably thinner than the wall thickness of the end portions *63a*, *63b* thereof, so as to provide a high transmittance. The shapes of through holes at the end portions *63a*, *63b* can be determined so as to suit the configurations of the discharge electrodes to be inserted therein. The through holes at the two end portions *63a* and *63b* need not be identical.

In the embodiment of FIG. 16, the outside diameter of the luminous arc discharge portion at the middle of the ceramic arc tube is larger than that of the end portions thereof and the inside surfaces at opposite ends of the arc discharge portion are curved at different radii of curvature, so that the temperature of the coldest spot can be raised or lowered simply by modifying the radius of curvature of the inside surface at the end of the arc discharge portion. Accordingly, the temperature of the coldest spot can be accurately controlled by selecting proper shape of the end parts of the arc discharge portion irrespectively of the configuration of the electrodes and the direction of the lamp energization, whereby the luminous efficiency and colour rendition of the discharge lamp are stabilized to facilitate the design of the discharge lamp. Furthermore, excessive temperature rise at the end parts of the arc discharge portion is prevented, and hence pressure rise in the arc tube is prevented, and breakage of the arc tube and excessive reduction of the luminous efficiency are prevented. Consequently, a high strength against thermal stress is ensured to provide a long service life of the arc tube.

Although the invention has been described with a certain degree of particularity, it is understood that the present disclosure has been made only by way of example and that numerous change in details of construction and the combination and arrangement of parts may be resorted to without departing from the scope of the invention as hereinafter claimed.

What is claimed is:

1. A method of producing a ceramic arc tube of metal vapour discharge lamps, comprising steps of forming a tubular green body by a mixture material containing fine alumina particles and plasticizer whose main ingredient is non-thermoplastic organic substance; shaping said tubular green body in a fusiform cavity of a die by applying fluid pressure to inside of said tubular green body so as to inflate a middle portion of the tubular green body more than end portions thereof; and firing the thus shaped green body after removal thereof from said die.

2. A method as set forth in claim 1, wherein said shaped green body is pre-fired to remove said plasticizer therefrom and fired to produce the ceramic arc tube.

* * * * *